US007401089B2

(12) United States Patent
Benton et al.

(10) Patent No.: US 7,401,089 B2
(45) Date of Patent: Jul. 15, 2008

(54) STORAGE REPORTS FILE SYSTEM SCANNER

(75) Inventors: James R. Benton, Seattle, WA (US); Ran Kalach, Bellevue, WA (US); Paul Adrian Oltean, Redmond, WA (US); Sarosh C. Havewala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 11/206,425

(22) Filed: Aug. 17, 2005

(65) Prior Publication Data

US 2007/0043747 A1 Feb. 22, 2007

(51) Int. Cl.
*G06F 17/30* (2006.01)
(52) U.S. Cl. ..................................... 707/101
(58) Field of Classification Search ............... 707/2, 707/101, 102, 10; 709/203
See application file for complete search history.

(56) References Cited

U.S. PATENT DOCUMENTS

| | | | | |
|---|---|---|---|---|
| 2005/0021657 A1* | 1/2005 | Negishi et al. | ............... | 709/213 |
| 2005/0044089 A1* | 2/2005 | Wu et al. | ..................... | 707/100 |
| 2005/0065961 A1* | 3/2005 | Aguren | ....................... | 707/102 |
| 2007/0038697 A1* | 2/2007 | Zimran et al. | ............... | 709/203 |

* cited by examiner

*Primary Examiner*—Etienne P LeRoux
(74) *Attorney, Agent, or Firm*—Workman Nydegger

(57) ABSTRACT

Described is a storage reports scanner that works to generate reports of storage usage in computer systems in an efficient manner. The scanner receives a set of namespaces for a file system volume from a storage reports engine. The scanner scans file system metadata to construct a directory table of entries corresponding to a directory tree of nodes representative of the hierarchy of directories of the file system volume. Each node corresponding to a namespace in the namespace set is marked as included. A second scan of the file system metadata determines, for each file, whether that file is in or under an included directory by accessing the directory table. For each file that is in or is under an included directory, file information is returned to the engine. The engine may request the scanner to provide full path information, which the scanner determines via the directory table.

17 Claims, 7 Drawing Sheets

STORAGE REPORTS FILE SYSTEM SCANNER

BACKGROUND

Managing storage in enterprise configurations is a complex process that presents information technology (IT) departments with many challenges. "Storage Reports" is a service comprising a technology/functionality that provides a set of storage reports to be used by IT administrators to efficiently audit and track the usage of large storage volumes. For example, an administrator may want to see a sorted list of all files larger than one-hundred megabytes on a given namespace, sorted by size, and with summary information on totals. Another such report may provide summary information for each file type (e.g., "Media Files") on a given namespace, including the one-hundred largest files within each file type category. Thus, storage reports help an administrator identify inefficient use of storage, implement mechanisms to prevent future misuse, monitor usage patterns and utilization levels on file servers and other servers, anticipate storage needs, analyze emergency situations and take preventive and/or corrective actions.

While storage reports thus provide valuable functionality, generating the storage reports can take a considerable amount of time, and also consume significant input/output (I/O) and processor resources. This is because in general, to generate a storage report requires scanning one or more storage volumes, each of which may be very large.

SUMMARY OF THE INVENTION

Briefly, the present invention is directed towards a method and system by which storage reports are generated via a time and memory efficient method of gathering the required file system information. In one example implementation, this is accomplished by coupling an optimal series of sequential direct access read operations on file system metadata with inline sub-tree namespace filtering and delayed file full path calculations.

A storage reports scanner receives a set of namespaces for a file system volume from a storage reports engine. The scanner scans file system metadata to construct a directory table of entries corresponding to a directory tree of nodes representative of the hierarchy of directories of the file system volume. Each node corresponding to a namespace in the namespace set is marked as included.

A second scan of the file system metadata determines, for each file, whether that file is in or under an included directory by accessing the directory table. For each file that is in or is under an included directory, file information is returned to the engine. The engine may request the scanner to provide full path information, which the scanner determines via the directory table.

Other advantages will become apparent from the following detailed description when taken in conjunction with the drawings, in which:

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
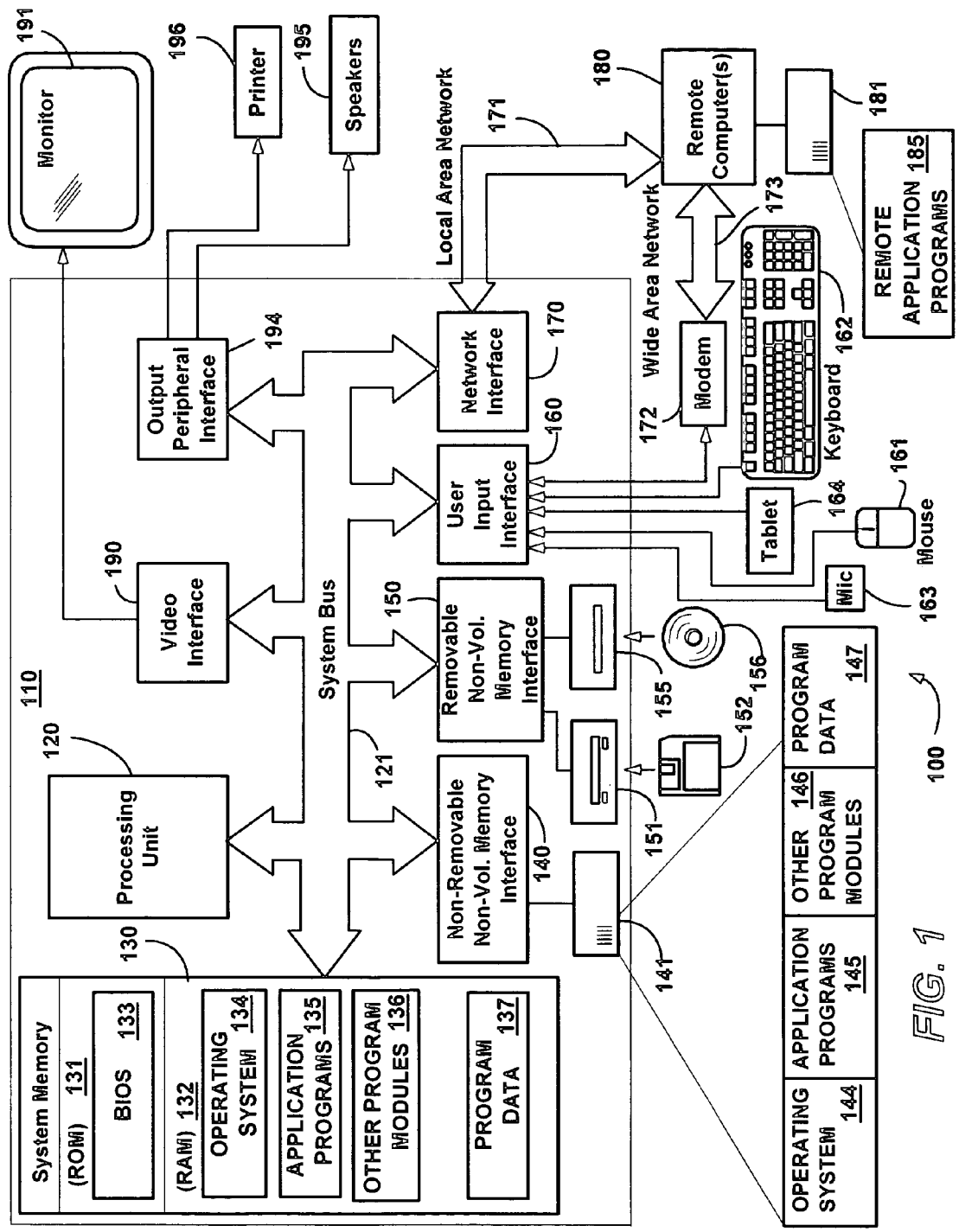
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. The main computer system 120 may store some or all of its data on a storage area network.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Storage Reports File System Scanner

Various example aspects of the technology described herein are generally directed towards efficiently generating storage reports by directly scanning file system metadata. A storage reports engine identifies a volume, of among possibly multiple volumes, along with a set of one or more input namespaces for each volume, where in a hierarchical file system, a namespace comprises the recursive set of files and sub-directories or sub-trees located under an arbitrary directory in the file system. The storage reports engine initiates a file system metadata scan on each volume, rather than using native operating system/file system query interfaces. Described is a multi-pass, multi-phase file system metadata scan that is efficiently filtered to return to the storage reports engine file information for just those files that reside underneath a given set of sub-tree namespaces. As described below, this results in a time and memory efficient method of gathering the required file system information, essentially by coupling an optimal series of sequential direct access read operations on the file system metadata with inline sub-tree namespace filtering and delayed file path calculations.

As will be understood, numerous ways to implement the present invention are feasible, and only some of the alternatives are described herein. For example, an implementation described herein scans file system metadata arranged in a single database per volume, such as a master file table (MFT) in a Microsoft®-based file system (NTFS). However, the present invention will provide benefits with virtually any arrangement or organization of file system metadata. As such, the present invention is not limited to any of the examples used herein, but rather may be used numerous ways that provide benefits and advantages in computing in general.

Figure 2:
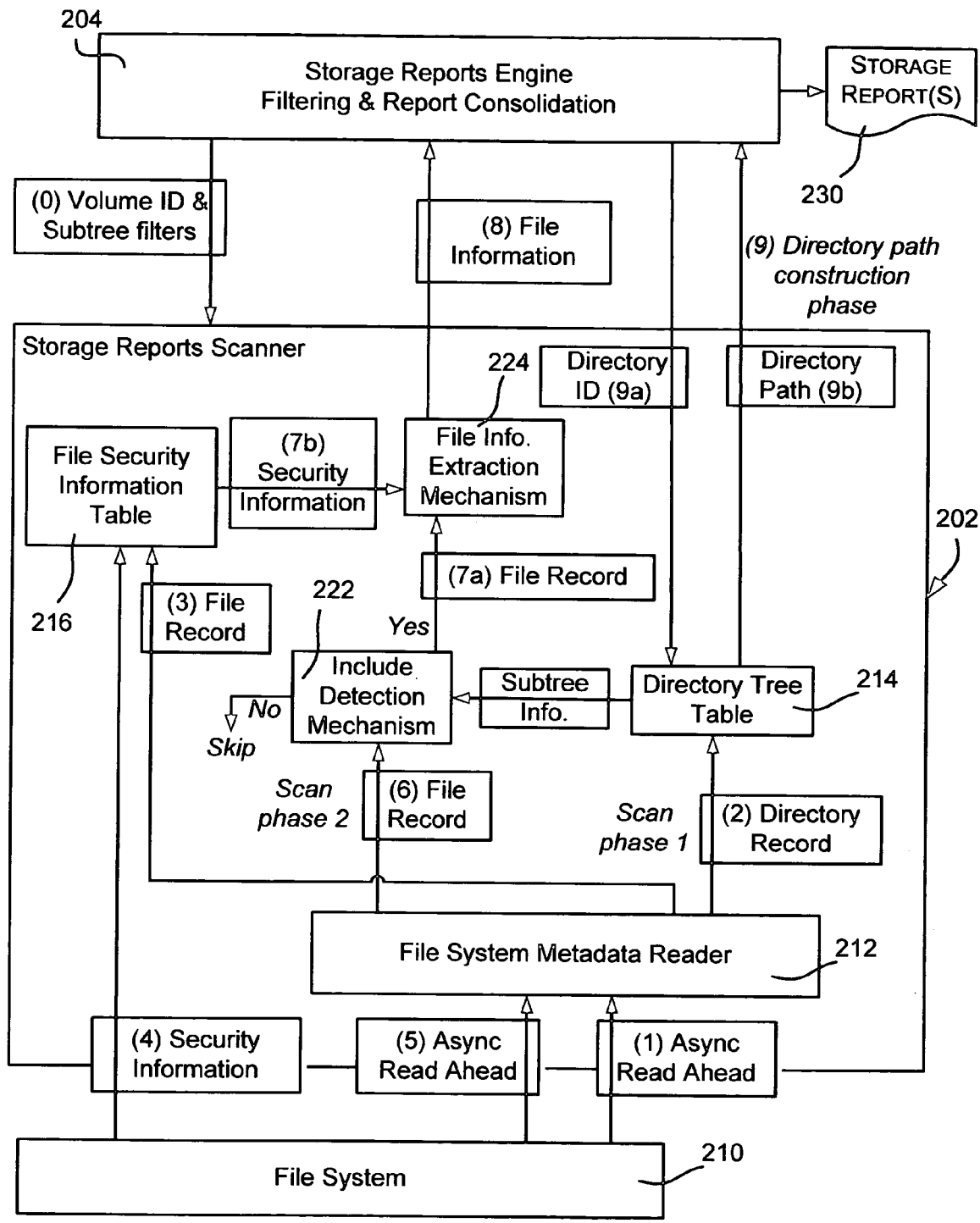
FIG. 2 is a block diagram representing various components for efficient execution of volume scans to generate storage reports, in accordance with various aspects of the present invention.

Turning to FIG. 2 of the drawings, there is shown an example implementation comprising a storage reports scanner 202 coupled to a storage reports engine 204. In general, the storage reports scanner 202 reads the file system information, filters the information based on namespace location and delivers this information to the storage reports engine 204. As described below, the storage reports engine 204 identifies the file system volumes that need to be scanned, coordinates the storage reports scanner on each of these volumes, filters file information, and multiplexes information for a single file to multiple storage reports (report correlation). Note that the division of functionality and structure between these components is somewhat arbitrary, and it is also equivalent to have the functionality and structure implemented in a single component or in more components than the two components 202, 204 shown.

The storage reports scanner 202 takes at least two pieces of information from the storage reports engine, namely the file system volume ID, which can be a live volume or shadow copy volume, and a list of namespaces (subtree filters) to identify the files of interest on the volume. This step is represented in FIG. 2 by the block/step numbered zero (0) being sent from the storage reports engine 204 to the storage reports scanner 202. As described below, the storage reports scanner 202 efficiently reads the metadata of the file system 210, via a file system metadata reader 212, and presents the storage reports engine 204 with information for each file that resides in the list of namespaces. Note that the use of the scanner 202 provides good scalability in accessing the file system metadata (as opposed to using native file system APIs, which are not scalable enough in enumerating large quantities of files).

A first phase comprises a directory and security scan phase, in which the storage reports scanner initiates an asynchronous, direct access read procedure on the file system metadata for the specified volume. One primary purpose of this phase is to build a directory tree, because the file system metadata is generally scattered randomly as database records.

One implementation employs a dedicated read-ahead thread to fill a data block with file records while a main scan thread processes a previously filled data block. However, this is only an optimization, and there are other ways this asynchronous read operation could be implemented, (e.g., with a single thread) as known to those skilled in the art. This phase is generally represented in FIG. 2 by the block numbered one (1) between the file system 210 and file system metadata reader 212, and also in the flow diagram of FIG. 5 as step 502.

Figure 6:
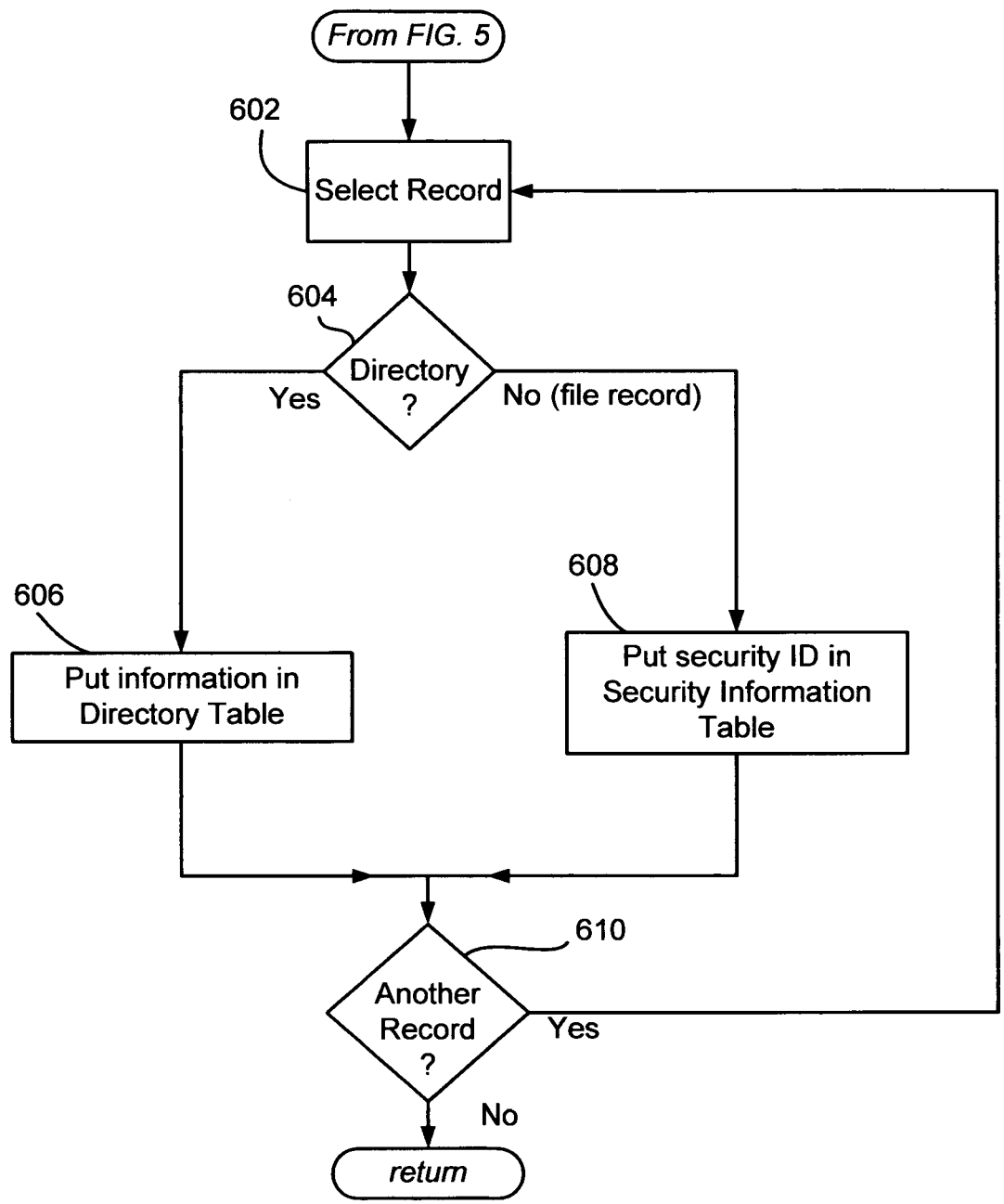

As the records are obtained via the serial scan, as represented in the flow diagram of FIG. 6 via steps 602 and 610, each file record in the data block is processed as set forth in FIG. 2 and FIG. 6. When a given file record represents a directory, as detected (step 604) via an attribute in the record, the directory ID, parent ID and directory name, each of which are present in the metadata record, are added (e.g., as a directory record numbered in FIG. 2 as step two (2) and in FIG. 6 at step 606) to a directory table 214. In one embodiment, the directory table 214 is implemented as a bucket hash table with parent pointers, such that the table is optimized for both directory ID lookup and leaf-to-root pointer navigation.

When a given file record represents a file instead of a directory, the file security ID is added to a file security table 216. This is generally represented in FIG. 2 by the block numbered three (3) between the file system metadata reader 212 and file security table 216, and in FIG. 6 via step 608. In one implementation, the file security table 216 is a hash table that maps security ID to file security information, such as file owner. This will ultimately allow a storage report to identify the owner of a file of interest.

When the scan is complete (no more records remain at step 610), the directory table 214 comprises a record for each directory, and with the parent pointer information therein conceptually forms a directory tree. Note that the mechanism/algorithm described herein are designed to allow several file system scans. This is because certain storage reports may need multiple scan phases, e.g., scans for "Files by Type," "Files by Owner," "Duplicate files" and so forth need two file system scan phases. Some variations of the duplicate files scan may need more than two file scans.

Figure 5:
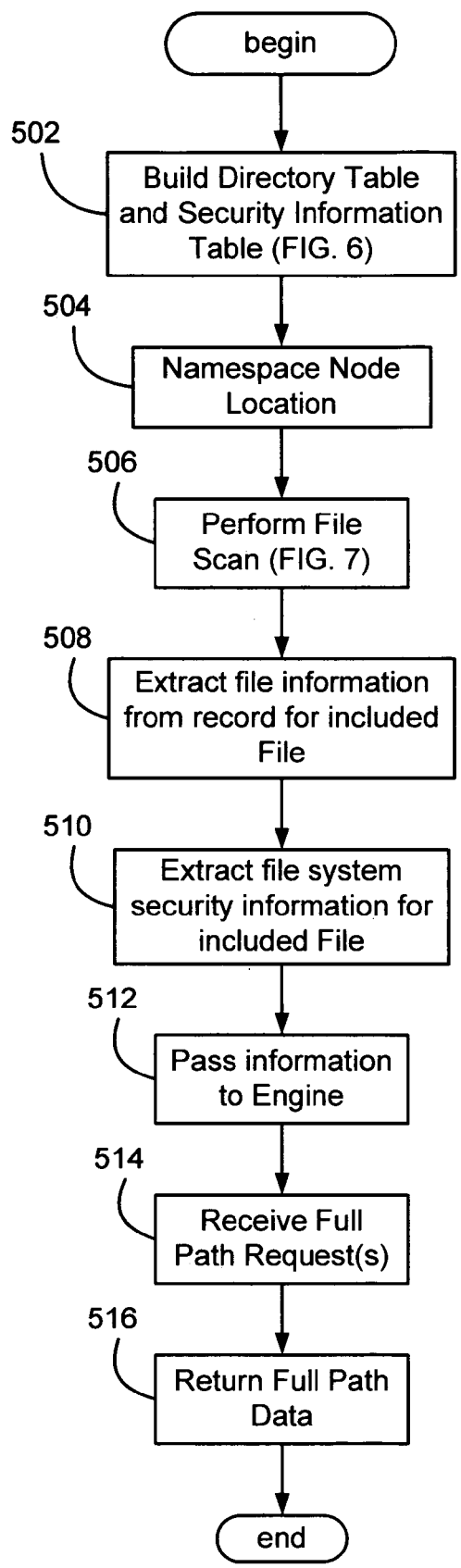
FIGS. 5-7 comprise a flow diagram generally representing example steps for efficiently generating storage reports via directory and file scanning, in accordance with various aspects of the present invention.

For each namespace specified by the engine 204, the directory node in the directory table 214 that represents the namespace root directory is located, as represented in the flow diagram of FIG. 5 via step 504. This may be accomplished with a standard file system query, that is, provide the namespace and receive the corresponding file ID, from which the entry in the directory table is located. Each matching directory node is marked with an identifier to represent the corresponding namespace, essentially to indicate that the directory is one of interest (its contents will be included) in the storage report. One implementation uses the index of the namespace in the array of namespaces given by the engine 204. This identifier will be used in the file scan phase for namespace filtering, as described below.

Figure 3:
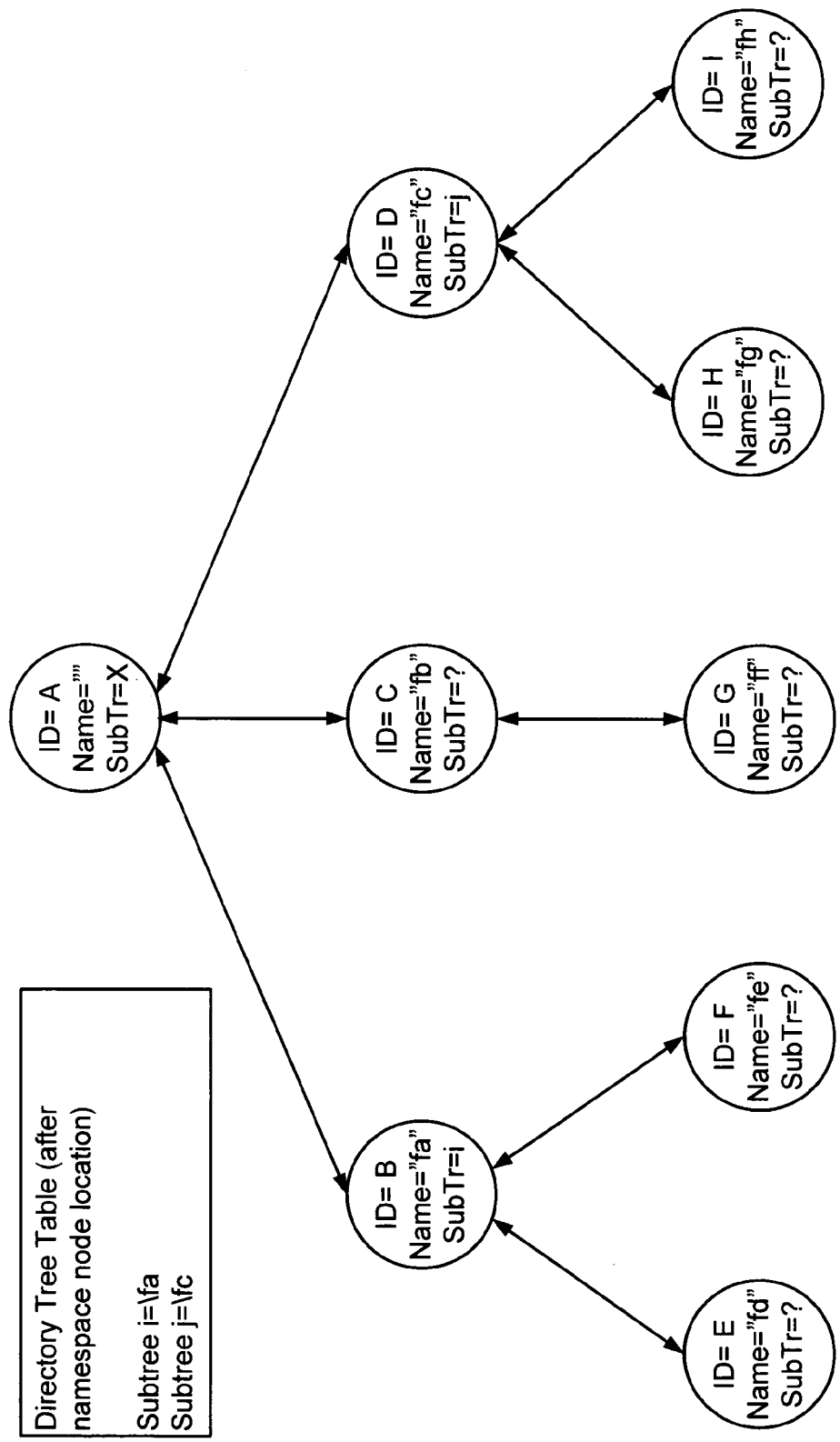
FIG. 3 is a representation of a directory tree resulting from a scan, after namespace node location, in accordance with various aspects of the present invention.

FIG. 3 generally represents such a directory tree following namespace node location. As can be seen, some nodes are specifically marked as included within a namespace, (those with an actual subtree identified, i and j) while others are not known at this time, that is, in an unknown state. The root node is marked as excluded, represented by a capital "X" character, since it was not specifically included.

File system security information is gathered by reading the file system security metadata. For each file security ID in the file security table 216, security information such as owner, access control, and so forth is extracted, and the information mapped to the ID in the file security table. This is generally represented in FIG. 2 by the block numbered four (4) between the file system 210 and file security table 216.

Figure 7:
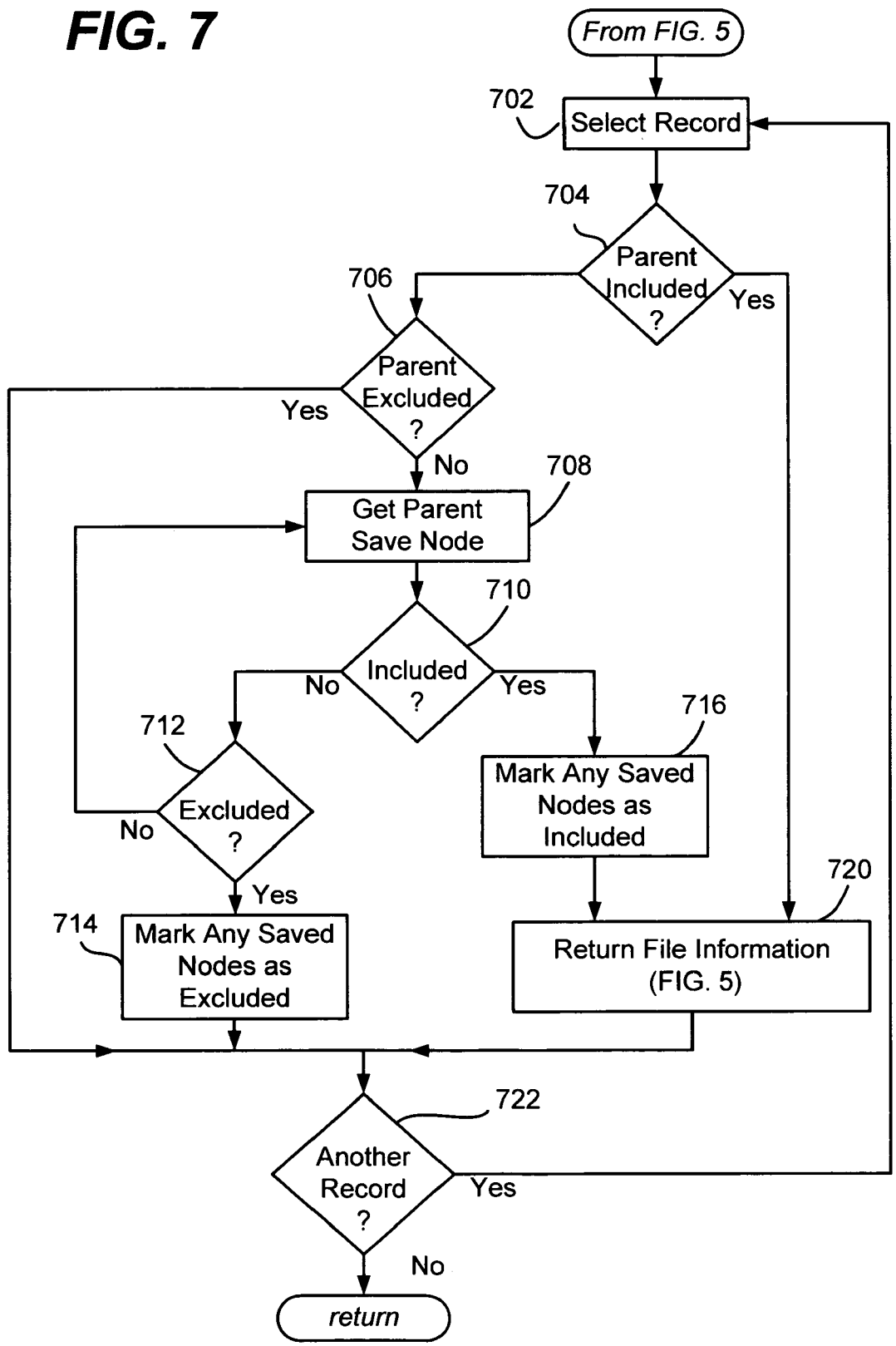

Once the namespace node location and file system security information is gathered, the file scan phase begins, as generally represented in FIG. 2 via the step/block numbered five (5) and in FIG. 5 via step 506 (as well as in FIG. 7). Again, a read thread and separate processing thread may be used, whereby the scan is an asynchronous direct access read procedure on the file system metadata for the specified volume. Note that the read thread can discard directory records so that only file records are returned in the data block, or if not, the processing record can discard them.

Each file record in the data block is processed by first extracting the parent ID from the record, essentially to see if that file is included in a specified namespace or not, as generally represented in FIG. 2 via the step/block numbered six (6) and in FIG. 7 via steps 702 and 704. This is accomplished by an include detection mechanism 222 that locates the corresponding directory node in the directory table 214. The directory node will be in one of three possible inclusion/exclusion states with respect to whether that node is in a specified namespace, namely unknown, included or excluded. Unknown means the node was not specifically marked has not been interrogated yet, which initially is any node not specifically corresponding to one of the engine-specified namespaces. In other words, just after marking nodes marked at step 504 (FIG. 5) but before the file scan, there will be one node in the directory table 214 in an included state for each namespace specified by the engine 204.

If the parent is excluded, step 706 of FIG. 7 moves on to select the next file record. For unknown nodes, the namespace filtering inclusion or exclusion state for the file record is determined by navigating upwards (via the parent pointers) in the directory table 214 until a node is encountered that either has a known inclusion/exclusion state, or the volume root node is reached, which is excluded. This upward navigation is represented in FIG. 7 by steps 708-716; note that an unknown node loops back to step 708. Further, note that if a file record corresponds to a hard link, it may have multiple parents; in such an event, the tree is walked as necessary for each parent.

Any files under an included node are included, as the inclusion state is marked by an identifier representing a namespace. Any files under an excluded node should be excluded. Note that the volume root node is marked as excluded, unless it is one of the engine-specified namespaces.

Figure 4:
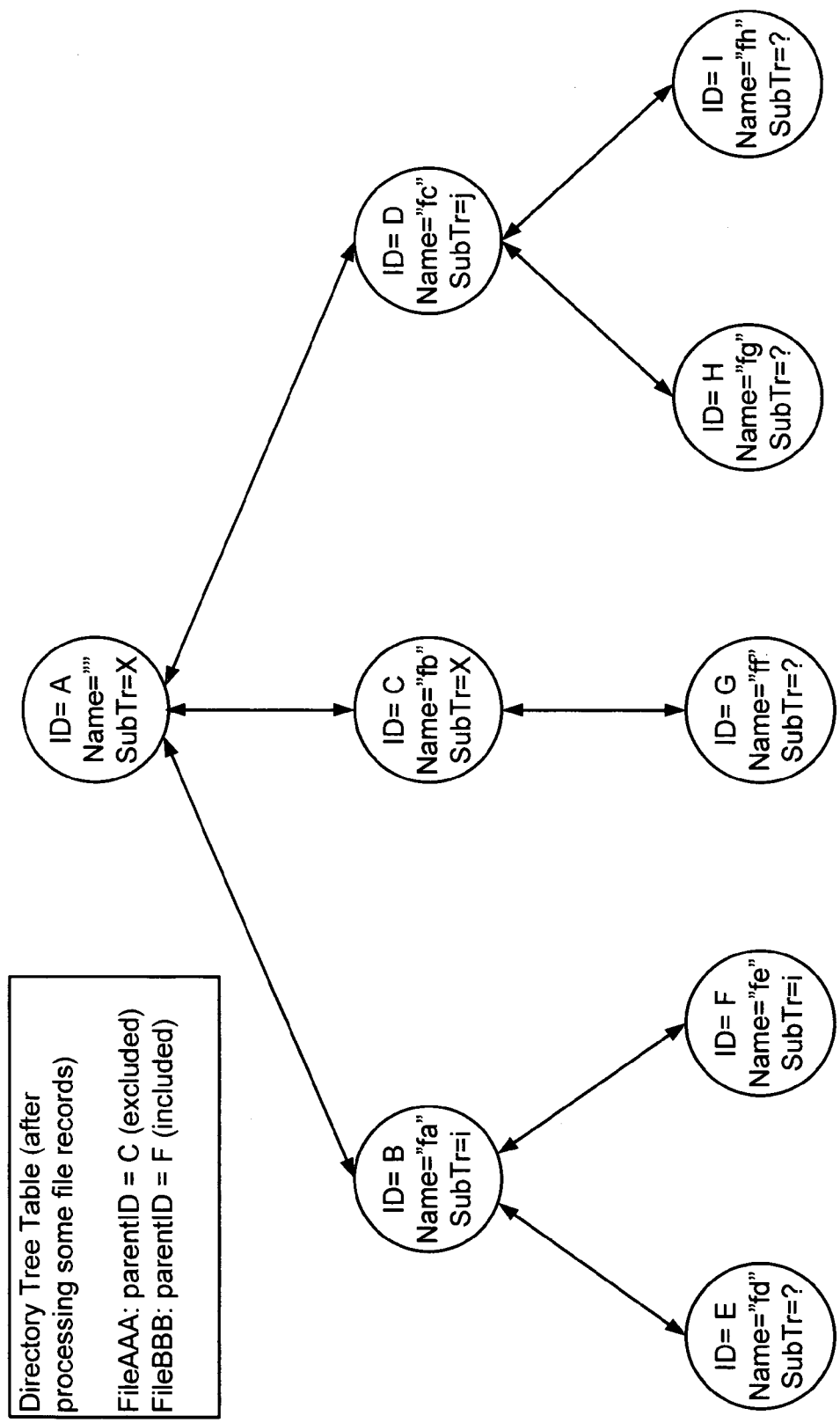
FIG. 4 is a representation of a directory tree after processing some file records, in accordance with various aspects of the present invention.

For efficiency, while walking the tree, all nodes visited that have an unknown state are saved at step 708. When a higher node is found that is either included or excluded, these lower nodes will be updated to the resulting state, i.e., included (step 716) or excluded (step 714). This reduces the number of unknown nodes, thereby reducing and ultimately eliminating the tree walking. This is also generally represented in FIG. 4, where some file records have been processed, and the node with parentID=C is now known to be excluded, while the node with parented=F is now known to be included.

Note that in one implementation, if a file is located in multiple namespaces, the file will be considered to reside in the deepest of the namespaces given by the engine. In this implementation, the scanner reports only the deepest namespace given by the engine (the layer above the scanner) because the engine figures out nesting relationships between namespaces and does the right multiplexing based on it. The engine thus has the task of multiplexing this file to the nested namespaces. Further note that this step can be skipped if the engine has specified a single namespace which is the volume root, in which case all files are included.

One reason for this is that to reduce the number of scans, different storage reports may be consolidated into a single operation by the engine, as generally described in U.S. patent application Ser. No. 11/107,977. The engine needs to know where a file is exactly, so it can match it to its relevant storage report or reports.

For each file record that is determined to be included, a number of pieces of information are extracted from the file record, as represented in FIG. 5 via step 508. These may include (by way of example and not limitation) file name, logical file size, allocated file size, creation time, last modified time, last accessed time, file attributes and flags, parent directory ID and namespace ID. This is also generally represented in FIG. 2 via the step/block numbered seven-a (7a), where the file record is passed to a file information extraction mechanism 224. Also extracted by the mechanism 224 is the file system security information from the file security table 216, which may include the file owner and/or other information, as generally represented in FIG. 2 via the step/block numbered seven-b (7b), and in FIG. 5 via step 510. The file information is then exposed to the engine 204 via a callback or other inter-process or intra-process communication mechanism, as generally represented in FIG. 2 via the step/block numbered eight (8) and in FIG. 5 via step 512.

At this time, the storage reports engine may filter returned file or files according to its own criteria, such as to locate the largest one-thousand files, and so forth. It is alternatively feasible to push some or all of this filtering information down to the scanner 202, whereby namespace-included files can be further examined against other criteria before being considered included.

In any event, to return one or more human-readable storage reports 230, the storage reports engine 204 needs to return a full directory path for each included file. This could have been returned by the scanner with each included file, however obtaining and returning directory paths is a time-consuming and resource-consuming operation.

Thus, another part of the overall efficiency results from delaying the overhead of constructing and storing full file paths during the active scan. Instead, because the storage reports engine 204 performs filtering, (e.g., adaptive filtering such that the filtering parameters get tighter as the scan continues), in most cases, the final set of filtered files is just a fraction of all the included files on the volume. The storage reports engine 204 and scanner 202 take advantage of this by determining the full directory path only on the resultant set of files.

To determine a full directory path, given a parent directory ID from the exposed file information (step 514) the storage reports scanner 202 constructs the full directory path by locating the parent directory node in the directory table 214. From this node, the storage reports scanner navigates upwards in the directory tree, saving the name of each directory node until a namespace root node (a node originally marked as included) is encountered. The full directory path is then constructed by concatenating the saved directory names onto the namespace path originally given as input by the storage reports engine. This directory ID received, directory path returned (step 514) phase is represented in FIG. 2 by the directory ID block (9a) and the directory path block (9b). As can be readily appreciated, this only needs to be done for the fraction of files that matched all filtering criteria, not just namespace filtering.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   constructing a directory tree;
   scanning metadata of a file system; and accessing the directory tree based on the metadata to determine whether each file in the file system is included within a specified namespace, wherein accessing the directory tree based on the metadata includes determining if a file's parent directory represented by a node in the tree is marked as included or excluded, and if neither included nor excluded, navigating upwards in the directory tree to a next higher parent node until a higher-level parent node is located that is either included or excluded.

2. The method of claim 1 wherein constructing the directory tree comprises scanning the file system metadata and recording information for directories in a hash table.

3. The method of claim 1 further comprising, saving an identifier of at least one node that is neither included nor excluded, and for each such node identifier, marking the corresponding node as either included or excluded based on locating the higher-level parent node that is either included or excluded.

4. The method of claim 1 further comprising, marking nodes in the directory tree that correspond to the specified namespace as included.

5. The method of claim 1 further comprising, providing file attribute information for each node that is included in the specified namespace.

6. The method of claim 1 further comprising, providing file security information for each node that is included in the specified namespace.

7. The method of claim 1 further comprising, accessing the directory tree to provide full path information for a requested directory as identified by an identifier.

8. In a computing environment, a system comprising:
a storage reports engine; and
a storage reports scanner coupled to the storage reports engine, the storage reports engine specifying a namespace set of at least one namespace of a file system volume to the storage reports scanner, the storage reports scanner configured to scan metadata of the file system volume and return file information for each file in the file system that is included within the specified namespace set,
wherein the storage reports scanner determines whether a given file is included in the specified namespace set by scanning the file system metadata in a first phase to construct a directory tree of nodes representing hierarchically-arranged directories in the file system volume, marking each node corresponding to a specified namespace in the set as included, and scanning the file system metadata in a second phase to determine via the directory tree whether each file in the file system volume is included within the specified namespace set, and
wherein the storage reports scanner accesses the directory tree to determine if a file is included by determining if a file's parent directory represented by a node in the tree is marked as included or excluded, and if neither included nor excluded, by navigating upwards in the directory tree to a next higher parent node until a higher-level parent node is located that is either included or excluded.

9. The system of claim 8 wherein the storage reports scanner operates via a read thread that returns records corresponding to the metadata into a record block, and via a processing thread that processes the records in the record block.

10. The system of claim 8 wherein the storage reports engine provides a directory identifier to request a full path of a directory, and wherein the file system scanner accesses the directory tree to provide full path information by concatenating path information for each directory above the requested directory.

11. At least one computer-readable storage medium having stored computer-executable instructions, which when executed perform steps, comprising:
receiving a namespace set of at least one namespace of a file system volume;
scanning file system metadata to construct a directory table of entries corresponding to a directory tree of nodes representative of a hierarchy of directories of the file system volume;
locating each directory entry corresponding to a namespace in the namespace set and marking the entry as an included directory;
scanning the file system metadata to determine for each file by accessing the directory table to determine whether that file is in or under an included directory, wherein said scanning includes determining if a file's parent directory entry is marked as included or excluded, and if neither included nor excluded, selecting a next higher parent directory entry until a higher-level parent directory entry is located that is either included or excluded; and
providing file information for each file that is in or is under an included directory.

12. The computer-readable storage medium of claim 11 having further computer-executable instructions comprising, constructing a security information table, and wherein providing the file information comprises accessing the security information table to return security information for that file.

13. The computer-readable storage medium of claim 11 having further computer-executable instructions comprising, saving an identifier of at least one directory entry that is neither included nor excluded, and for each such identifier, marking the corresponding directory entry as either included or excluded based on locating the higher-level parent directory entry that is either included or excluded.

14. The computer-readable storage medium of claim 11 having further computer-executable instructions comprising, accessing the directory tree to provide full path information for a requested directory as identified by an identifier.

15. The computer-readable storage medium of claim 11 wherein providing the file information comprises returning at least one item from a set of items, the set containing, file name, logical file size, allocated file size, creation time, last modified time, last accessed time, file attributes and flags, parent directory ID and namespace ID.

16. The computer-readable storage medium of claim 11 wherein providing the file information comprises returning data corresponding to an owner of the file.

17. The computer-readable storage medium of claim 11 wherein a given file is in one namespace of the namespace set and is also in at least one deeper namespace below the one namespace, and wherein providing the file information for the given file comprises reporting only a deepest namespace in the namespace set.

* * * * *